United States Patent
Lei et al.

(10) Patent No.: US 7,386,620 B2
(45) Date of Patent: Jun. 10, 2008

(54) SYSTEM FOR WEB SERVICE QOS OBSERVATION AND DYNAMIC SELECTION

(75) Inventors: Hui Lei, Scarsdale, NY (US); Liangzhao Zeng, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 821 days.

(21) Appl. No.: 10/916,486

(22) Filed: Aug. 12, 2004

(65) Prior Publication Data

US 2006/0036752 A1 Feb. 16, 2006

(51) Int. Cl.
*G06F 15/16* (2006.01)
(52) U.S. Cl. ............... 709/229; 709/223; 709/224; 709/226; 370/252; 370/254
(58) Field of Classification Search ........ 709/223–224, 709/240, 245, 202, 204, 226, 229; 370/252, 370/254
See application file for complete search history.

(56) References Cited

U.S. PATENT DOCUMENTS

| | | | |
|---|---|---|---|
| 6,516,350 B1 * | 2/2003 | Lumelsky et al. | 709/226 |
| 2004/0236547 A1 * | 11/2004 | Rappaport et al. | 703/2 |
| 2005/0021598 A1 * | 1/2005 | Dunlop et al. | 709/202 |
| 2006/0218302 A1 * | 9/2006 | Chia et al. | 709/245 |
| 2007/0079005 A1 * | 4/2007 | Jasen et al. | 709/240 |

OTHER PUBLICATIONS

QoS Issues in Web Services, D. A. Menasce, George Mason University, IEEE Internet Computing, Nov.-Dec. 2002, pp. 72-75.
Quality Driven Web Services Corporation, L. Zeng. et al., Proceedings of the 12th International Conference on World Wide Web (WWW), Budapest, Hungary, ACM Press, May 2003.

* cited by examiner

*Primary Examiner*—Thu Ha T Nguyen
(74) *Attorney, Agent, or Firm*—Whitham, Curtis, Christofferson & Cook, PC; Stephen C. Kaufman

(57) ABSTRACT

A system and method permits a user to observe the Quality of Service (QoS) of Web services and allows dynamic selection based on the user's preference. The system is built on QoS observation meta-model and comprises a QoS observation manager, service criteria generator, service repository, evaluation manager and service invocation manager. The QoS observation manager allows users to define observation model and deploy to the service criteria generator. The service criteria generator computes the QoS criteria values of services by subscribing events which include user feedback events and service execution events, based on deployed observation model. The service repository provides the persistence storage for QoS criteria value. The evaluation manager allows users to specify selection preferences and select services based on QoS ranking. The service invocation manger invokes Web services and publishes events according to the QoS of Web services. The system enables users to observe the QoS of Web service and select Web service based on QoS ranking that reflects the user's selection preference.

5 Claims, 5 Drawing Sheets

SYSTEM FOR WEB SERVICE QOS OBSERVATION AND DYNAMIC SELECTION

BACKGROUND OF THE INVENTION

1. Field of the Invention

The present invention generally relates to computer facilitated Web service QoS (Quality of Service) observation, evaluation and selection. Using the invention, a human user is able to observe the QoS of Web services, ranking Web services, and even allows the system to select Web services based on his/her preference.

2. Background Description

Web services are autonomous software systems identified by URLs (Universal Resource Locators) which can be advertised, located, and accessed through messages encoded according to XML-based (extensible Markup Language) standards (e.g., SOAP (Simple Object Access Protocol), WSDL (Web Services Description Language), and UDDI (Universal Description, Discovery and Integration)) and transmitted using Internet protocols (EPs). Web services encapsulate application functionality and information resources, and make them available through programmatic interfaces, as opposed to the interfaces provided by traditional Web applications which are intended for manual interactions. In addition, since they are intended to be discovered and used by other applications across the Web, Web services need to be described and understood both in terms of functional capabilities and QoS properties.

The ever increasing number of functional similar Web services being made available on the Internet, there is a need to be able to distinguish them using a set of well-defined Quality of Service (QoS) criteria. Currently, most approaches that deal with QoS of Web services only address some generic dimensions such as price, execution duration, availability and reliability (see Daniel A. Menasce, "QoS Issues in Web Services", *IEEE Internet Computing*, 6(6), 2002; Liangzhao Zeng, Boualem Benatallah. Marlon Dumas, Jayant Kalagnanam, and Quan Z. Sheng, "Quality Driven Web Services Composition", *Proceedings of the 12the international conference on World Wide Web* (*WWW*), Budapest, Hungary. ACM Press, May 2003). However, these generic criteria might not be sufficient for observing QoS of Web service, evaluation and selection.

Moreover, most of the current approaches rely on service providers to advertise their QoS information or provide an interface to query the QoS values, which is subject to manipulation by the providers. Obviously, service providers may not advertise their QoS information in a "neutral" manner, for example, execution duration, reliability, etc.

SUMMARY OF THE INVENTION

It is therefore an object of the present invention to provide a system and method that addresses the respective limitations in QoS evaluation and selection for Web service. The invention proposes a QoS observation meta-model for Web services and enables computation QoS criteria of Web service by observation based on a user-defined QoS observation model.

It is a further object of the invention to enable user preference-based QoS-aware Web service selection.

Various formalisms have been developed for modeling QoS of Web service, wherein a collection of criteria is predefined for evaluating Web services. This invention leverages existing formalism and provide a meta-model for observing the QoS of Web service. Using the meta-model, the observation model designers can defines QoS criteria, wherein the criteria can be either primitive or composite. A composite criterion is defined based on a collection of primitive and/or composite criteria. The dependence among the criteria is formalized as dependence expression (DE) that is constructed using a collection of operators. Each DE is associated with an evaluation policy that is modeled as an event-condition rule. The evaluation policy specified in which situation that the DE should be computed in order to update the value of composite criterion for Web services. When the observation model is defined and deployed to service criteria generator, there is a provided mechanism to enable model-driven QoS criteria value generation.

According to another aspect of the invention, there is provided a mechanism to select Web service based on generated QoS criteria value and user's preference. This invention equips convex hull-based service filtering mechanism that provides a visualization tool to allow users to remove inefficient Web services.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The invention embodies three salient features as follows:

Extensible QoS Observation Model

In the presence of multiple Web services with overlapping or identical functionality, service requesters need QoS criteria to distinguish one service from another. It is not practical and sufficient to come up with a standard QoS model that can be used for all Web services in all domains. This is because QoS is a broad concept that can encompass a number of context-dependent and domain specific non-functional properties, for example, privacy, reputation and usability. Therefore, instead of trying to emulate all the possible criteria, the invention provides an extensible QoS observation meta-model that allows users to define both the generic and domain specific criteria.

Model-Driven QoS Criteria Generation

Once QoS observation models have been defined, the invention provides a mechanism which takes observation models as input and generate executable codes to compute and update evaluation score and criteria values for each defined QoS criterion for Web services. At runtime, QoS information can be collected from service properties that are published by providers, execution monitoring, and requesters' feedback based on the specification of quality criteria.

It should be noted that the computing the QoS criteria of Web service is based on the dependence expression and associated evaluation policy.

Convex Hull-Based Service Filtering and Preference-Oriented Selection

Different users may have different preferences or requirements on QoS. It is important to be able to represent QoS from the perspective of service requesters' preference. A service selection mechanism should provide means for users to accurately express their preferences without resorting to complex coding. This invention equips convex hull-based service filtering mechanism that provides a visualization tool to allow users to remove inefficient Web services step by step first, and then make choice using limited number of criteria.

In a preferred embodiment of the invention, the QoS observation manager allows users to define observation model and deploy to the service criteria generator. The service criteria generator computes the QoS criteria values of services by subscribing user feedback events and service execution events, wherein the executable code is generated based on deployed observation model. The service repository provides the persistence storage for QoS criteria value. The evaluation manager allows users to specify selection preference criteria, filter out the inefficient services, and select services based on QoS ranking. The service invocation manger invokes Web services and publishes events according to the QoS of Web services.

Figure 1:
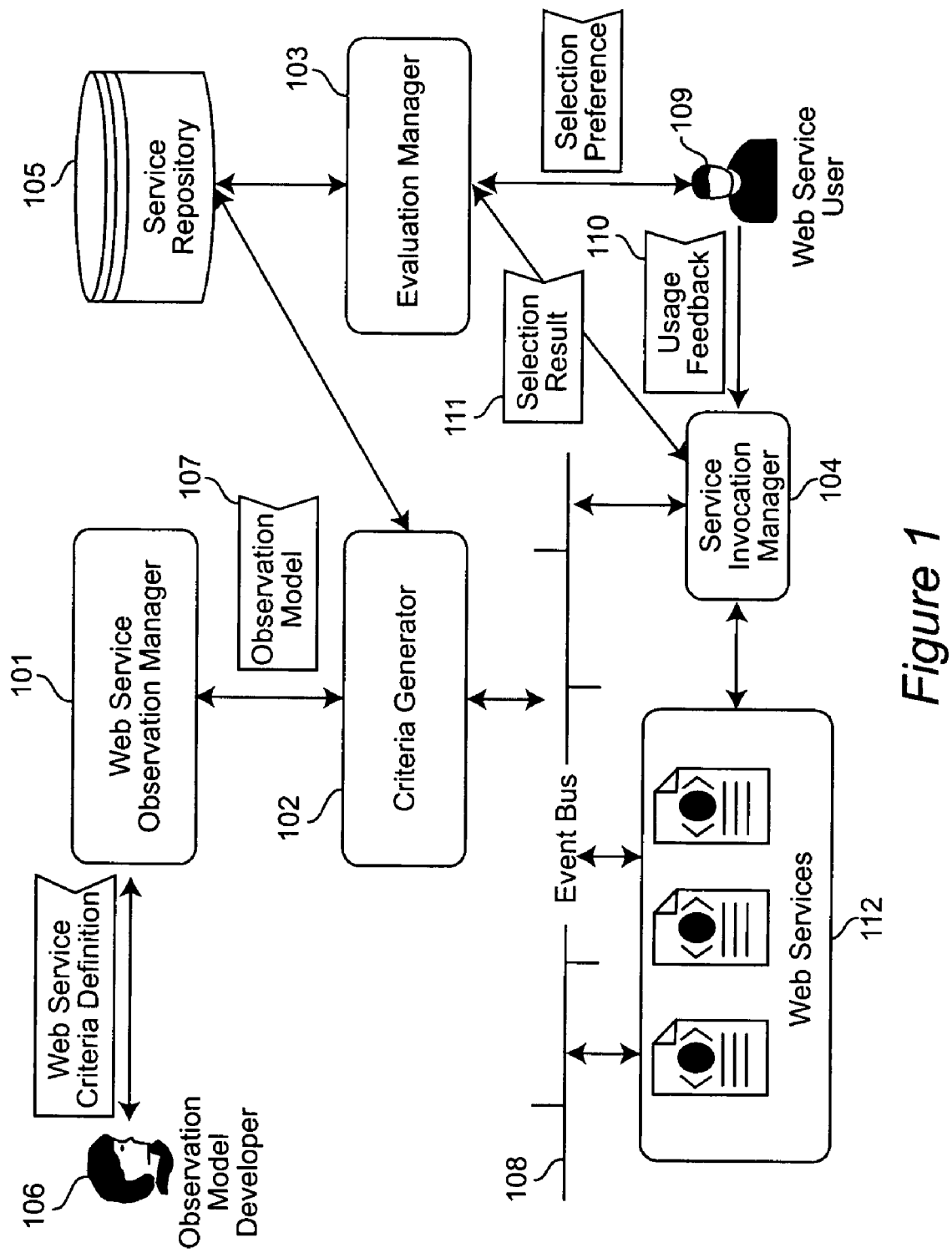
FIG. 1 is a block diagram showing an embodiment of a system on which the invention is implemented.

Referring now to the drawings, and more particularly to FIG. 1, there is shown an embodiment of a system on which the invention may be implemented. At the heart of the system are the Web service observation manager (OM) 101, criteria generator (CG) 102, evaluation manager (EM) 103, service invocation manager (SM) 104, and service repository (SR) 105. The OM 101 allows the observation model designer 106 to specify an observation model 107 and interface with the CG 102 to deploy the observation model to CG 102 in order to observe the QoS properties of Web services.

An observation model 107 contains information about QoS criteria specification, wherein the QoS criteria can be either primitive or composite. The criteria can be either a simple type of a structure type, and single valued or multi-valued. The value of a criterion is specified using dependence expression (DE), where a primitive criteria's DE is based on the events subscribed by the CG 102, while a composite criteria's DE is constructed based on a collection of primitive or composite criteria using criteria operators. The criteria operators include a relation operator, an event operator, a vector operator, a set operator, a scalar operator, a Boolean operator and a mathematic operator, etc. Other than DE, each criterion also is associated with an evaluation policy (EP) which is an event-condition rule. The event in the rule specifies the possible events that will trigger the computing the value of the criterion, which the condition defines the guiding condition of computing the DE. The event in the rule specify the possible events that will trigger the computing the value of the criterion, which the condition defines the guiding condition of computing the DE. The event can be either primitive or composite event. The composite event expression (see Table 1) in this invention consists of: (1) Event Expression, that specifies the concrete sequences of events that triggers a compound event, (2) Event Detection Mode, that specifies what parts of event instance history can be used to detect, (3) Event Consumption Mode, that specifies the issues of what happens to an event instance after it is used.

TABLE 1

Syntax of Event Expression

```
Event ::= EventName(AttrValuePairs)
    | (event |< DectionMode > |[ ConsumptionMode])
        | UNLESS( Event, Event )
        | ALL( EventList )
        | AND( EventList )
        | ANY( EventList )
        | SEQUENCE( EventList )
        | TIMES(Event, Integer, Integer)
        | NOT( Event )
        | WITHIN( TimeInterval, Event )
        | PAST( TimeInterval, Event )
DectionMode::=first | last | cumulative
ConsumptionMode::= exclusive | shared | exclusive parameter
AttrValuePairs ::= null
    | AttrName = Value {, AttrName = Value}*
Value ::= FreeValuable | Constant
AttrDefinition ::= null
        | ATTRIBUTES { Type AttrName = Expression; }+
EventList ::= Event {, Event}+
```

Three event detection modes are supported, namely first, last and cumulative. The first (last) mode is minimum-oriented selection strategies, which only selects the set of instances with the oldest (youngest) timestamps. The cumulative mode detects composite events based on all possible combination of component events.

There are three different consumption modes, namely shared, exclusive, and exclusive parameter, which can be specified individually for each component event. The shared mode does not harm any instance of component event since all the component events are reused for the detection of other composite events. The exclusive parameter mode removes all instances of component event that consists of an instance of composite event after the composite event is detected. The exclusive mode removes all in stances of component event before the occurrence of terminating component event of composite event.

Figure 2:
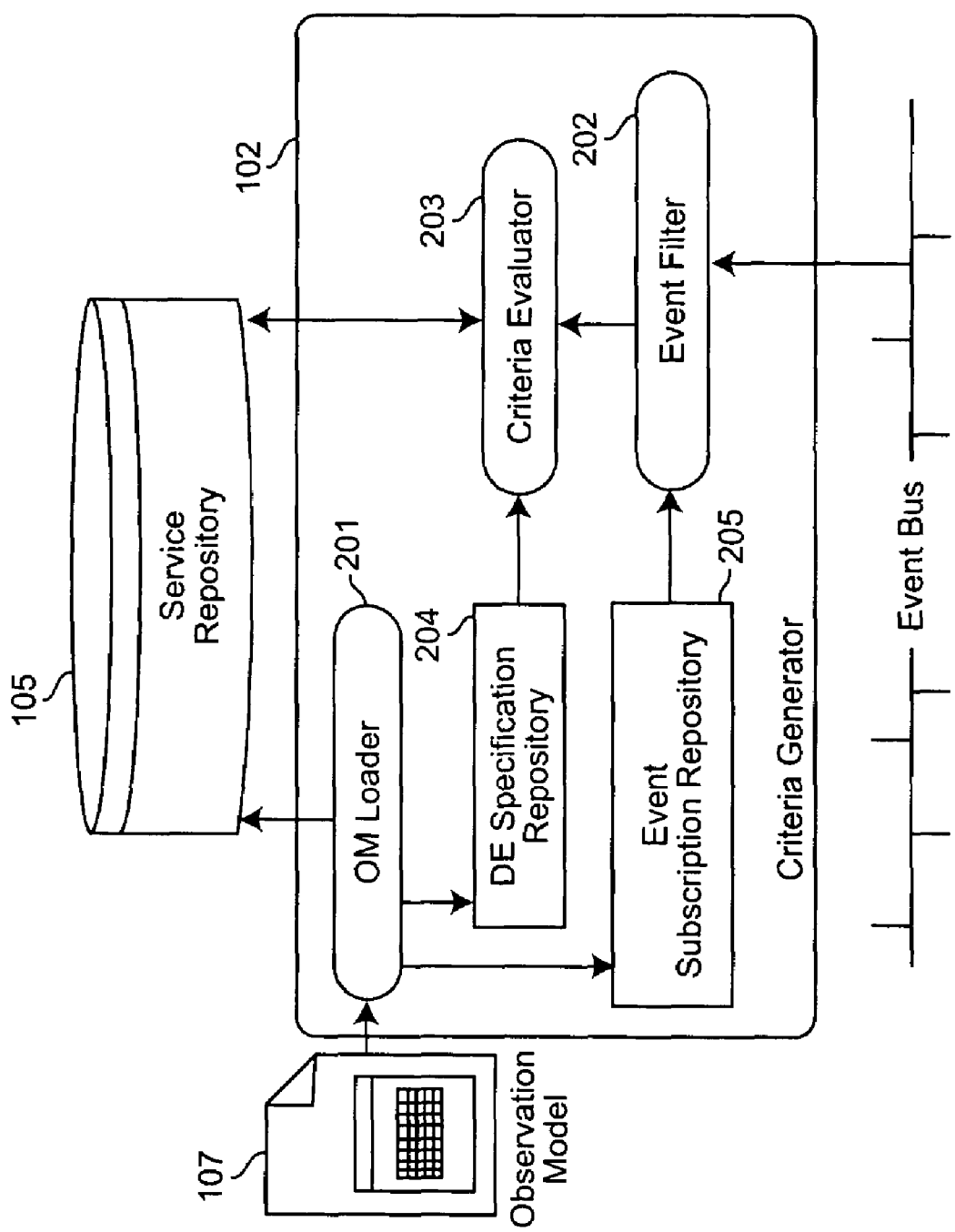
FIG. 2 is a block diagram showing the overall flow of a criteria generator for computing value of criteria of Web service.

The Criteria Generator (CG) 102 takes an observation model 107 as input to generate executable code to compute criteria value for a Web service. As shown in FIG. 2, the Criteria Generator 102 consists of an Observation Model Loader (OM Loader) 201, an Event Filter 202 and a Criteria Evaluator 203 and maintains two repositories, namely a DE specification repository 204 and Event Specification repository 205. It also contracts with the service repository 105 to create storage schemas. The OM Loader 201 reads the observation model 105 specification and generates entries for the DE specification repository 204 and Event specification repository 205. The Event Filter 202 subscribes events from event bus 108 based on information in the Event Specification Repository 205. It also correlates primitive events to composite events and notifies the Criteria Evaluator 203. When the Criteria Evaluator 203 receives the notification of an event occurrence, it will evaluate the Evaluation Policies to check which DE needs to be computed in order to create or update the value of the criteria for Web service.

Returning now to FIG. 1, the Evaluation Manager 103 provides an interface that allows Web service users 109 to specify selection reference. By retrieving the QoS information, it provides service selection results to Service Invocation Manager (SM) 104 via the event bus (EB) 108. During the execution of Web services, based on subscribed execution event, the SM 104 publishes events to the EB 108 that are consumed by the CG 102. The SM 104 also allows Web service users 109 to provide User Feedback 110 information on service quality after the service invocations are completed. These user feedback information 110 are published to EB 108, and a selection result 111 is provided to the EM 103. Thus, the SM 104 invokes Web services 112, collects user's feedback on usage of Web services and publishes events according to the QoS of Web services.

Assuming that there is a set of S (S={$s_1$, $s_2$, . . . , $s_n$}) represents a set of Web services that have the same functional properties. Using m criteria (primitive or composite) to evaluate Web service, we can obtain the following matrix Q, in which each row $Q_j$ corresponds to a Web service, while each column corresponds to a quality dimension.

$$Q = \begin{pmatrix} q_{11} & q_{12} & \cdots & q_{1m} \\ q_{21} & q_{22} & \cdots & q_{2m} \\ \cdots & \cdots & \cdots & \cdots \\ q_{n1} & q_{n2} & \cdots & q_{nm} \end{pmatrix} \quad (1.1)$$

In this invention, two kinds of criteria are differentiated, namely positive and negative. For positive criteria, the higher the value, the better of the quality; for negative criteria, the lower of the value, the better of the quality. The each element in matrix Q will be normalized using one of the following equations. The equation 1.2 is for negative criteria, while equation 1.3 is for positive criteria.

$$V_{i,j} = \begin{cases} \frac{q_j^{max} - q_{i,j}}{q_j^{max} - q_j^{min}} & \text{if } q_j^{max} - q_{i,j}^{min} \neq 0 \\ 1 & \text{if } q_j^{max} - q_{i,j}^{min} = 0 \end{cases} \quad (1.2)$$

$$V_{i,j} = \begin{cases} \frac{q_{i,j} - q_j^{min}}{q_j^{max} - q_{i,j}^{min}} & \text{if } q_j^{max} - q_{i,j}^{min} \neq 0 \\ 1 & \text{if } q_j^{max} - q_{i,j}^{min} = 0 \end{cases} \quad (1.3)$$

In the above equation, $q_j^{max}$ is the maximal value of a quality criteria in matrix Q, i.e., $q_j^{max}=\max(q_{i,j})$, $1 \leq i \leq n$, while $q_j^{min}$ is the minimal value of a quality criteria in matrix Q, i.e., $q_j^{min}=\min(q_{i,j})$, $1 \leq i \leq n$.

Figure 3:
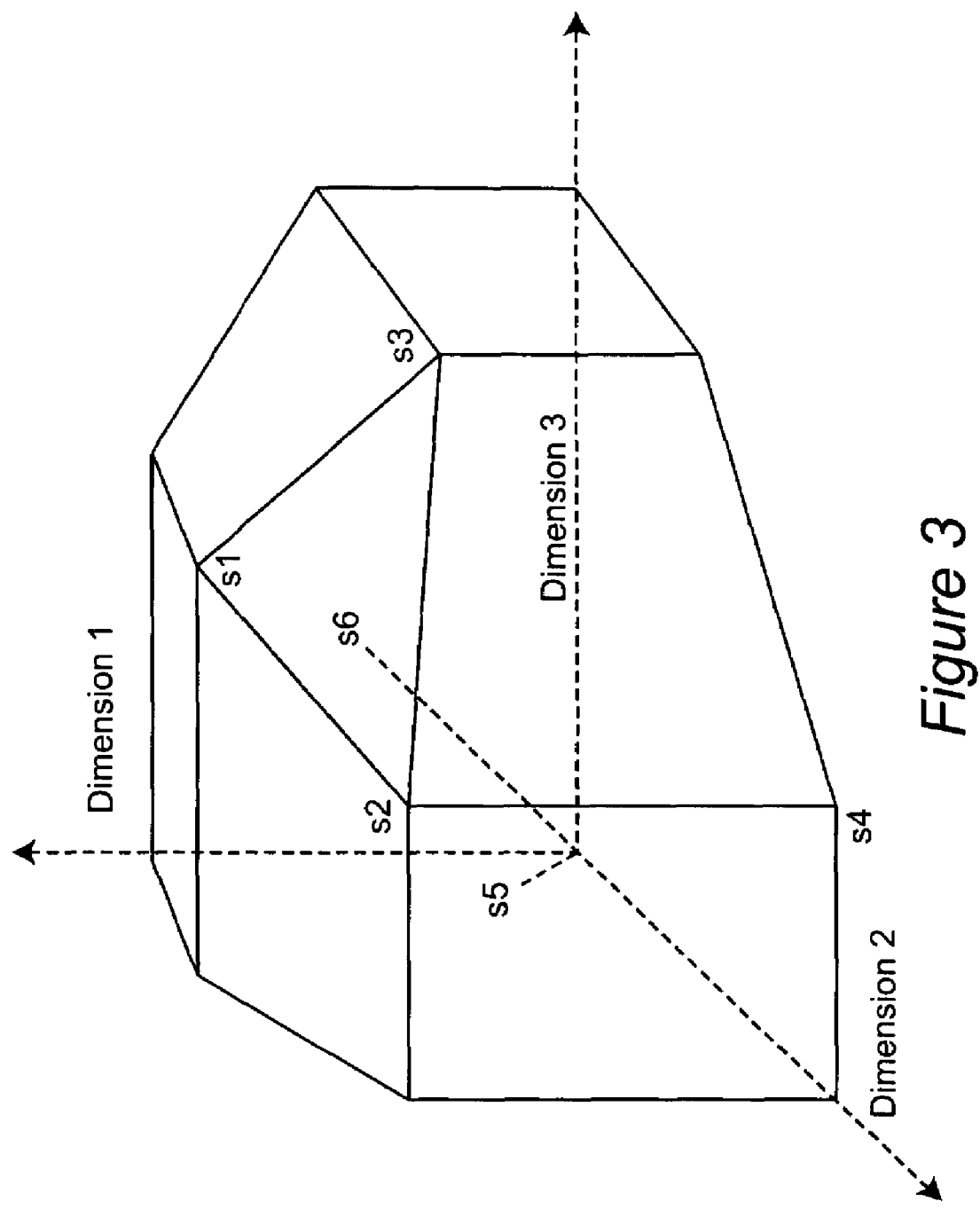
FIG. 3 is a diagram showing the convex hull For Service Selection.

It should be noted that the service selection includes two phases. In first phase, the users are allowed to select two or three most important criteria so that the Evaluation Manager can generate 2D (two dimensional) or 3D (three dimensional) convex hull based on the QoS properties of Web services (see FIG. 3 for an example). It should be noted that each Web service is considered as a spatial point in 2D or 3D dimensions and Web services that locate inside the convex hull are insufficient and will be discarded. The convex hull based selection can be invoked multiple times by selecting different set of criteria. After first phase, a set of candidate Web services are selected.

In second phase, a utility function $$\left( Score(s_{i,j}) = \sum_{j=1}^{k} (V_{i,j} * W_j) \right)$$

that is based on a selected k number of criteria is used to evaluate Web services, where the Web service has maximal value of the score is selected.

Figure 4:
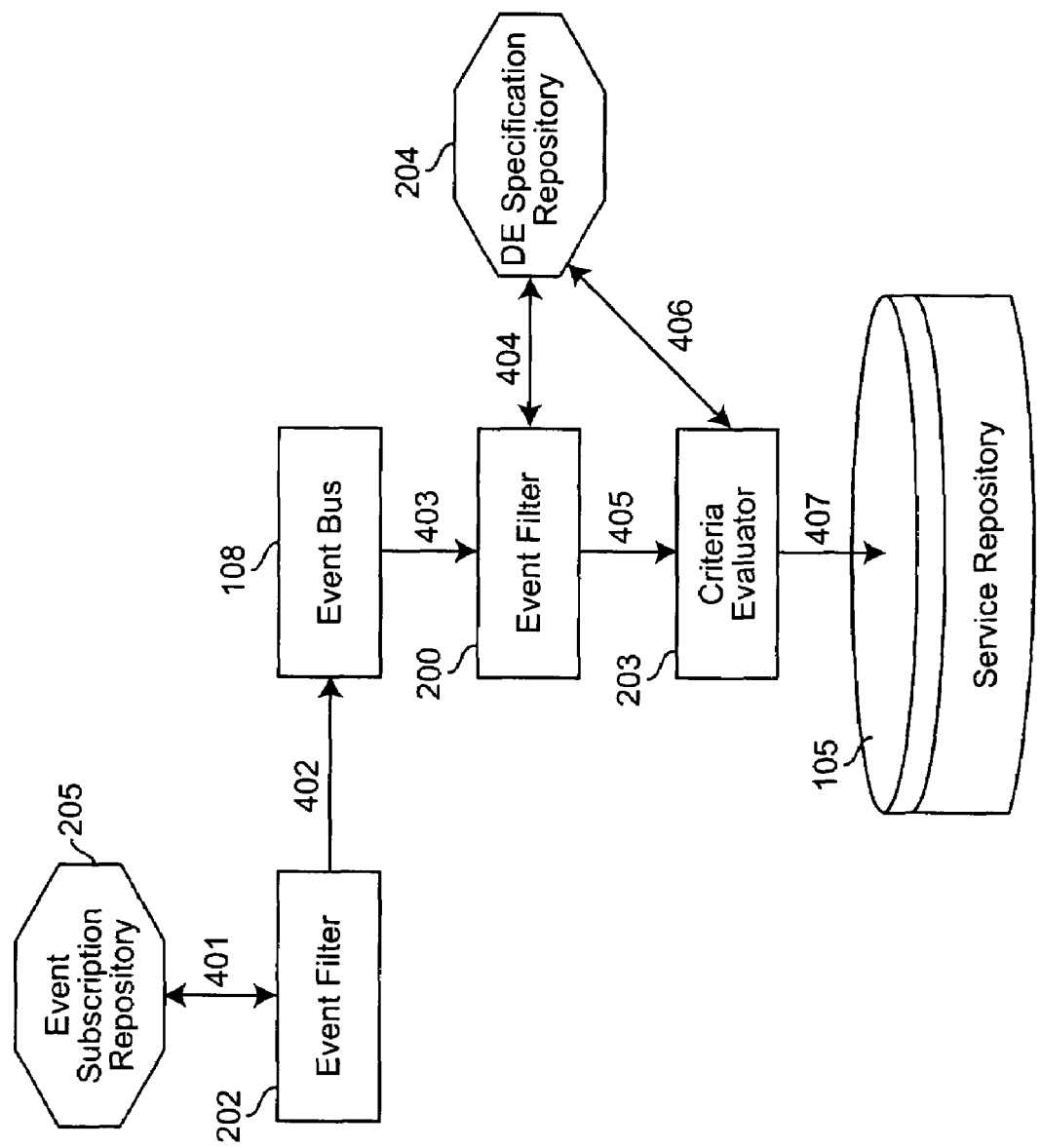
FIG. 4 is a flow diagram illustrating how the criteria generator computes QoS criteria of Web services.

FIG. 4 shows the various steps inside the Criteria Generator 102 in FIG. 2 taken to subscribe events and compute QoS criteria values of Web services 112. The event filter 202 queries event subscription repository 205 (Step 401) and subscribes events from event bus 108 (Step 402). The event bus 108 delivers events to event filter 202 based on subscription (Step 403). When event filter 202 receives events from the event bus 108, it consults with DE specification repository 204 (Step 404) and correlates events. When the criteria evaluator 203 receives an event notification from event filter 202 (Step 405), it consults with DE specification repository 204 and evaluates the evaluation policies to determinate which criteria need to be evaluated. Finally, the criteria evaluator 203 updates QoS criteria values in service repository 105.

Figure 5:
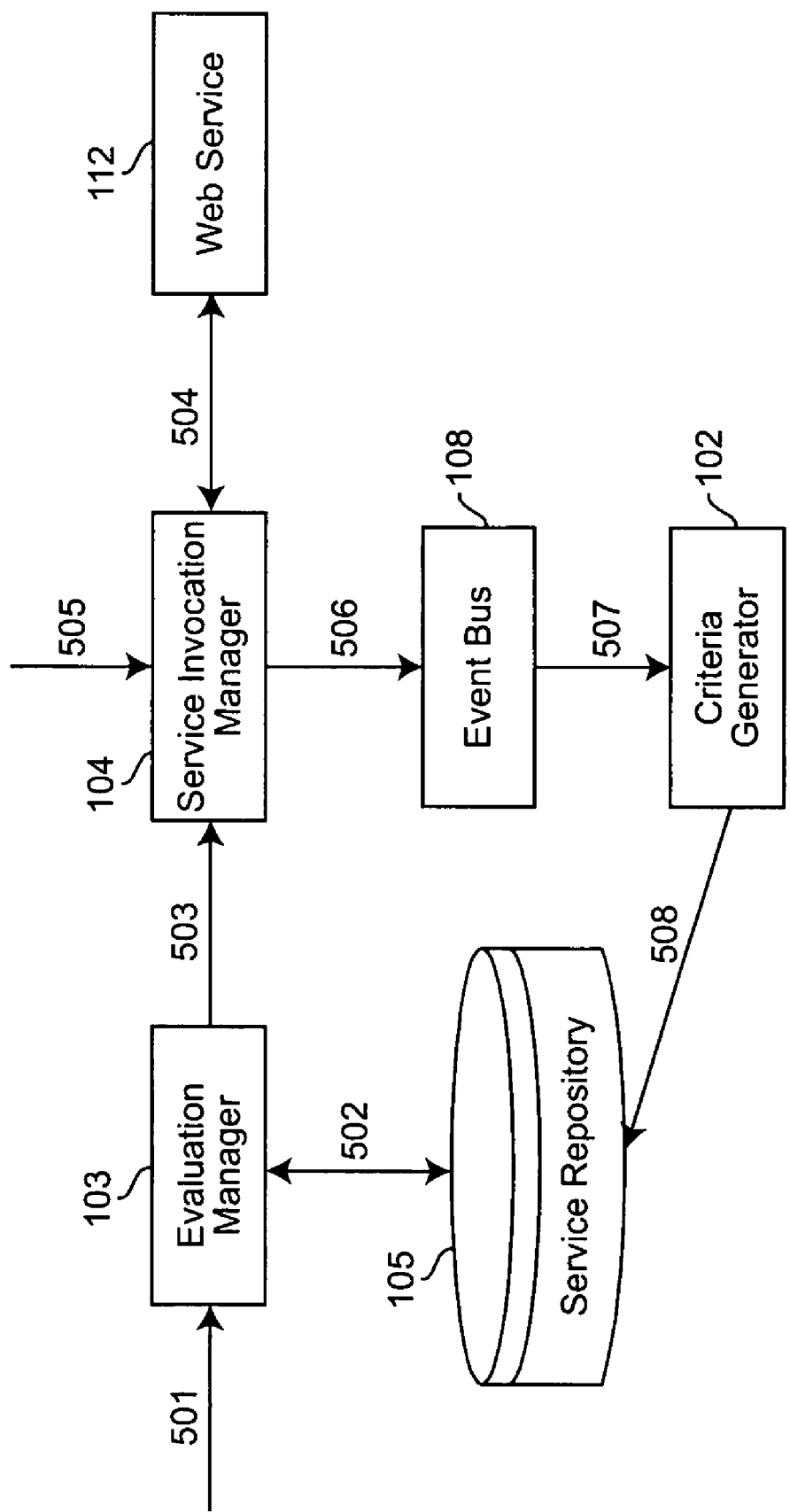
FIG. 5 is a flow diagram illustrating how the evaluation manager interacts with user to select Web services and provide QoS feedback to the system.

FIG. 5 shows the various steps of the system in FIG. 1 taken to select a Web service, invoke a Web service and publish execution events and user feedback events. When evaluation manager 103 receives user's selection preference on Web service (Step 501), it consults with service repository 105 (Step 502) and determinates which Web service is selected. The selection results are funneled to service invocation manager 104 (Step 503). The service invocation manager 104 invokes the Web service 112 (Step 504) and returns execution results to users and collects user's feedback on quality of services (Step 505). The service invocation manager 104 then publishes these events to the event bus 108 (Step 506). Finally, the events are delivered to the criteria generator 102 (Step 507) and then used to update the value of QoS criteria for Web services by the criteria generator (Step 508).

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A system for observing of Web services Quality of Service (QoS), comprising:
    a service criteria generator which computes QoS criteria values of services by subscribing user feedback events and service execution events, based on a deployed observation model;
    a QoS observation manager which allows users to define an observation model and deploy to the service criteria generator;
    a service repository which provides persistent storage for QoS criteria values;
    an evaluation manager which allows users to specify selection preferences and select services based on QoS ranking; and
    a service invocation manager which invokes Web services, collects user's feedback on usage of Web services and publishes events according to the QoS of Web services,
    wherein said service criteria generator comprises:
    an observation model loader which loads the observation model specification into the system;
    an event filter which subscribes events from an event bus based on event specification repository and correlates primitive events to composite events and notifies the criteria evaluator;

a criteria evaluator that evaluates evaluation policies to check which dependence expression needs to be computed in order to create or update a value of criteria for a Web service;

a dependence expression specification repository that stores dependence expressions, score functions and evaluation policies for each criteria; and an event specification repository that stores event specification that is subscribed by the criteria generator.

2. The system recited in claim 1 wherein a QoS observation manager provides tools and meta-models that allow observation model developers to define an observation model.

3. The system recited in claim 2, wherein said observation model includes a set of QoS criteria.

4. The system recited in claim 3, wherein QoS criterion includes a data type for storing raw information about the Web services' quality, a score function, a dependence expression and an evaluation policy.

5. The system recited in claim 1 wherein the evaluation manger provides user interface that allows Web service users to specify a service selection preference by giving two or three most important dimensions, creates a two dimensional or three dimensional convex hull to exclude efficient Web services, and selects Web service by utility function.

* * * * *